Nov. 26, 1940.  R. BÖSEL ET AL  2,223,057
PROCESS AND APPARATUS FOR FORMING TUBING
Filed Oct. 21, 1938
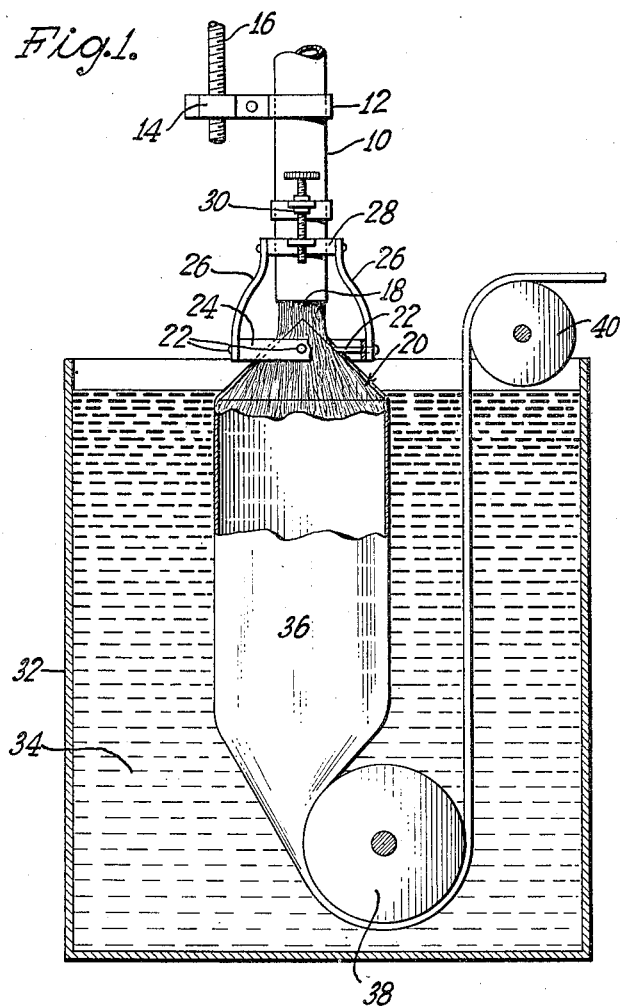
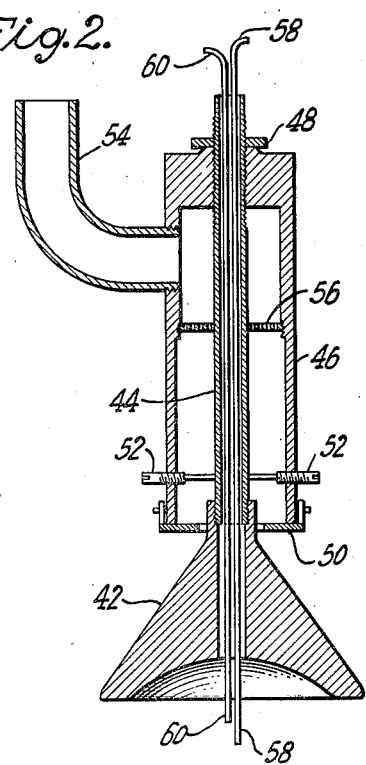
INVENTOR.
RICHARD BÖSEL
ALOIS SEIB
BY John M. Leach
ATTORNEY Patented Nov. 26, 1940

2,223,057

UNITED STATES PATENT OFFICE 2,223,057

PROCESS AND APPARATUS FOR FORMING TUBING

Richard Bösel, Fallingbostel, and Alois Seib, Mannheim, Germany, assignors to Sylvania Industrial Corporation, Fredericksburg, Va., a corporation of Virginia Application October 21, 1938, Serial No. 236,194
In Germany December 23, 1937

9 Claims. (Cl. 18—15)

The present invention relates to a method and apparatus for making tubing. More particularly, it relates to a method and apparatus for making flexible tubing of the type which can be used as an artificial sausage casing or cut into sections and used as a shrinkable closure for containers.

Tubing of the type herein disclosed has heretofore been formed by extruding hardenable material from an orifice or nozzle into a suitable hardening bath, or by flowing suitable material on to and over a substantially cylindrically shaped form which is continuously bathed with a hardening agent for the material. These methods of making tubing have occasioned certain difficulties since it has been necessary to make the extrusion orifices or nozzles with extreme accuracy in order that the size and thickness of the tubing will not vary beyond definite limits. This has increased the expense of manufacturing the tubing since the manufacture of a precision orifice or nozzle in and of itself is expensive, and, in addition, it has been necessary to make such nozzles or orifices of material which has a high resistance to corrosion because of the fact that the nozzle has always been in direct contact with a corrosive coagulating bath. Furthermore, the operation of such a nozzle has been beset with difficulties because the presence of particles of hardened material will clog the orifice and cause a stoppage in the manufacturing operations. Moreover, the tubing formed by extrusion through a constricted orifice is characterized by marked inequality of properties in transverse and longitudinal directions. It appears that the flow of a plastic material through a constricted orifice causes a pronounced alignment of the micelles longitudinally with the flow. The prior tubing is thus not suited for use as shrinkable closures because they are deficient in transverse shrinkage.

When a cylindrically shaped form has been used, it has been difficult to control the wall thickness of the tubing and to cause the tubing to feed down over the form without sticking and causing the tubing to tear or be deformed.

It is a general object of the invention to provide a method and apparatus for making flexible tubing.

It is a specific object of the invention to provide a method and apparatus for making flexible tubing which does not involve the use of a precision nozzle or orifice.

It is another object of the invention to provide a method and apparatus for making flexible tubing having less inequality in its ability to shrink in transverse and longitudinal dimensions than tubing made in accordance with known methods.

It is a further object of the invention to provide a method and apparatus for making flexible tubing especially adapted for use as a shrinkable closure for containers.

The method of the invention comprises forming a stream of hardenable liquid material into a substantially conically-shaped liquid film and hardening the material at or near the base of the conically-shaped film to set the material in the shape of a tube.

In the apparatus of the invention there is provided a flaring tube-forming member which preferably is substantially conical in shape. A suitable liquid material which can be hardened is discharged upon the tube-forming member, preferably near the apex so that the liquid material is caused to spread evenly over the member. The material flows off of the member in the form of a tube and is suitably treated with a hardening agent to set the material so precipitated from the tube-forming member in the shape of a tube.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

In the drawing:

Fig. 1 is a diagrammatic view of one form of the apparatus of the invention by which the process of the invention can be carried out;

Fig. 2 is a modified form of apparatus made in accordance with the invention; and Figs. 3 and 4 are modified forms of the tube-forming member which may be used in place of those illustrated by Figs. 1 and 2.

In the embodiment of the invention illustrated in Fig. 1, the material from which the tubing is to be formed is supplied by means of a conduit 10 provided with any well known type of control valve (not shown). The conduit is supported by means of a bracket 12 which carries a nut 14. The nut 14 is threaded on an adjustment screw 16 which is rotatably carried by any suitable type of support (not shown). This mounting enables the conduit 10 to be raised and lowered as desired and the conduit may be suitably provided with a flexible section (not shown) to enable this adjustment to be made.

The material pours or discharges from the open end 18 of the conduit 10 on to and preferably near the apex of a substantially cone-shaped tube-forming member 20 provided with a continuous and substantially sharply defined edge. The member 20 is supported by means of pins 22 which extend into openings provided in the member 20 and are carried by a ring 24 which is spaced at a considerable distance from the surface of the cone-shaped member. The liquid spreads over the conical surface of the member 20 and around the pins and forms an unbroken film below the pins. The ring 24 is carried by depending arms 26 which are suitably fastened to a ring 28 slidable on the conduit 10. The ring 28 can be moved upon the conduit 10 by means of a well known type of thumb screw adjustment 30, of which there may be one or more as desired.

A tank or container 32 is disposed beneath the tube forming member 20 in position to hold a suitable coagulating or other hardening agent. As the liquid material discharges from the open end 18 of the conduit 10, it falls freely and spreads over the surface of the tube-forming member 20 in a film of even thickness, and consequently forms a tube of uniform wall thickness as it flows from the substantially sharply defined edge of the tube-forming member. As the material flows over and from the tube-forming member it passes into a coagulating bath comprising a coagulating liquid 34 in a container 32 and is hardened and thus set in the form of a tube 36. The tube 36 passes downwardly through the liquid 34 and is collapsed as it passes over a suitable roller 38. The tube 36 passes out of the container 32 and over a roller 40 and is then conveyed for further treatment and processing in accordance with practices which are well known in the art.

The distance between tube-forming member 20 and the opening 18 of conduit 10 can be very accurately adjusted by means of the thumb screw 30 to control the distance which the liquid material falls after leaving the conduit 10 before it comes into contact with the tube-forming member. This enables the distribution of the material over the tube-forming member 20 to be very accurately controlled with the result that the thickness of the film of liquid material spreading over the tube-forming member 20 can be accurately controlled.

By means of the adjustment screw 16, the distance between the tube-forming member 20 and the bottom of the container 32 can be accurately adjusted. Since the level of the liquid 34 in the tank 32 is maintained substantially constant in any desired manner, the amount which the tube-forming member 20 dips into the coagulating liquid 34 can be accurately adjusted. If desired, the member 20 can be positioned entirely above the coagulating liquid 34, or it can be positioned to just contact with the surface of the liquid 34, or it can be submerged to any desired extent in the liquid 34. This enables the coagulating liquid 34 to be applied to the tube-forming material at the exact point necessary for proper setting of the material to form a tube of uniform wall thickness and undistorted shape.

If desired, a tube-forming member 20', shown in Fig. 3, formed in the shape of a hemisphere, can be substituted for the member 20 illustrated in Fig. 1; also the tube-forming member may take the shape of the member 20'', shown in Fig. 4. By selecting flaring members having shapes similar to those of members 20, 20' and 20'', it is possible to obtain a shape which cooperates with a liquid of any given consistency in the best possible manner.

The term "flaring" is used throughout this specification, including the claims, to describe a member which increases in circumference in a downward direction and is to be interpreted as meaning any member which has this configuration and is therefore substantially cone shaped. The tube-forming member may be formed of a cheap material such as glass, hard rubber, or any other material which is not attacked by the liquid 34.

Suitable materials which may be used to produce a flexible tubing in accordance with the present invention are cellulosic materials, such for example as cellulose ethers, cellulose esters, and viscose solutions; also gelatine, casein, rubber-containing solutions such as latex, vinyl resins, and other synthetic resins, all of which classes of materials are capable of being hardened by heat or chemical agents as known in the art.

The term "hardenable" has been used throughout this specification, including the claims, as meaning a substance which is capable of being changed from a plastic or liquid state to a solid state, although the solid state may not be hard in the sense that it is not yieldable since the hardened material will be sufficiently flexible to enable it to be used as a food casing or for other purposes where a flexible tubing is required.

The coagulating liquid 34 may be an acidic or basic liquid, depending upon the nature of the material of which the tubing is formed, the only requirement in regard to the liquid 34 being that it will act to coagulate or otherwise harden the material. If the tubing material is the type which is hardened by heat, the liquid 34 may be a hot aqueous or other liquid. If desired, a gaseous coagulating or hardening agent may be used in place of the liquid 34.

In the embodiment of the invention illustrated in Fig. 2, the tube-forming member comprises a substantially cone-shaped member 42. The cone-shaped member 42 has an axial opening therein which is threaded at the top and is secured upon the threaded lower end of a pipe 44. The pipe 44 passes up through a hollow material supply head 46 forming the conduit of this modification corresponding to the conduit 10 of the modification of Fig. 1 and is adjustably supported on the head by means of a thumb nut 48. The head 46 has a flange member 50 suitably attached to the lower open end thereof so that the flange extends inwardly towards the top or apex of the cone-shaped member 42. Set screws 52 are threaded through openings in the side wall of the head 46 and bear against the pipe 44. The pipe 44 and the tube-forming member 42 can be accurately centered in the opening in the flange member 50 by means of the set screws 52.

The tube-forming liquid material is supplied to the head 46 by means of a pipe 54 which connects with the hollow interior of the head 46. A screen 56 may be removably positioned within the hollow head 46 and is provided with an opening through which the pipe 44 passes. The screen 56 filters out any hardened particles which might be present in the tube-forming liquid and thereby prevents the occurrence of non-uniform portions in the formed tube. A pipe 58 passes through pipe 44 and terminates near the bottom surface of the tube-forming member 42. Coagulating liquid is passed through this pipe and into the interior of the formed tube to coagulate the material of which the tube is formed and set it in the shape of a tube. Excess or expended liquid can be removed from the interior of the tubing by means of a pipe 60 which extends through the pipe 44 adjacent to the pipe 58.

The tube-forming liquid flows from the head 46 and falls freely on to the tube-forming member 42 and spreads over the tube-forming member to form a tube. From the tube-forming member 42, the tubing is passed into a suitable coagulating bath, such as that shown in Fig. 1. The distance between the tube-forming member 42 and the edge of flange member 50 can be accurately adjusted by means of thumb nut 48 so that the amount of material which is caused to flow on to the tube-forming member 42 can be accurately adjusted.

The general operation of the apparatus illustrated in Fig. 2 is the same as that illustrated in Fig. 1, and it is to be understood that the tube-forming member 42 may be replaced by members having other shapes, for example, such as those shown at 20' and 20'' in Figs. 3 and 4.

The head 46 is adjustably supported over the coagulating tank in the same or in a similar manner to that illustrated in Fig. 1.

Tubing having different diameters can be formed by having a series of tube-forming members which are graduated in maximum external diameter, so that tubings of different diameters can be produced on the same machine by merely substituting one tube-forming member for another.

The present invention thus enables a tubing of uniform wall thickness and uniform diameter to be rapidly produced in an economical manner. The tubing so formed is much more uniform in strength and ability to stretch in transverse and longitudinal directions than tubing made by extrusion. This characteristic renders the tubing admirably suited for use as a covering or casing for food products, such as sausage, since the tubing is capable of withstanding the pressure exerted upon it during stuffing operations.

The tubing is also well-suited for use as a closure band or cap of the type which is frequently applied over the caps of bottles and similar containers, since its ability to shrink enables a tubing of given size to be used on containers of different sizes. The high transverse strength of the tubing also prevents splitting of the tubing when it shrinks around the bottle and the bottle cap.

The foregoing description has been given for the purpose of explanation and not limitation, since many changes may be made without departing from the spirit of the invention which is to be defined only by the depending claims.

What is claimed is:

1. The method of forming tubing comprising discharging a hardenable liquid material from above in a substantially freely falling stream onto a cone-shaped member adjacent the apex thereof to spread the substantially unhardened material over said member and cause it to fall therefrom in the form of a tube, and contacting said flowing material with a hardening agent to set the material only after it has substantially attained its tubular shape.

2. The method of forming tubing comprising discharging a hardenable cellulosic material from above in a substantially freely falling stream onto a cone-shaped member adjacent the apex thereof to spread the substantially unhardened material over said member and cause it to fall therefrom in the form of a tube, and contacting said flowing material with a hardening agent to set the material only after it has substantially attained its tubular shape.

3. The method of forming tubing comprising discharging a hardenable rubber containing liquid material from above in a substantially freely falling stream onto a cone-shaped member adjacent the apex thereof to spread the substantially unhardened material over said member and cause it to fall therefrom in the form of a tube, and contacting said flowing material with a hardening agent to set the material only after it has substantially attained its tubular form.

4. The method of forming tubing comprising discharging from above onto a member having a spreading surface terminating in a continuous and substantially sharply defined edge a freely falling stream of hardenable liquid material in such manner as to spread the material over said surface and cause it to flow downwardly in the form of a tube from said edge, and contacting said flowing material with a hardening agent only after it has substantially attained its tubular shape.

5. An apparatus for forming tubing comprising a tube-forming member having a liquid spreading surface and a substantially sharply defined edge, a supply means for a hardenable liquid material having an opening positioned to freely discharge hardenable liquid from above onto said surface over which it spreads and falls from said edge in the form of a tube, and means for contacting said flowing material with a hardening agent only after it has substantially attained its tubular shape.

6. An apparatus for forming tubing comprising a tube-forming member having a substantially conical liquid spreading surface and a substantially sharply defined edge, a supply means for a hardenable liquid material having an opening positioned to freely discharge hardenable liquid from above onto said surface over which it spreads and falls from said edge in the form of a tube, and means for contacting said flowing material with a hardening agent only after it has substantially attained its tubular shape.

7. An apparatus for forming tubing comprising a tube-forming member having a substantially conical liquid spreading surface and a substantially sharply defined edge, a supply means for a hardenable liquid material having an opening positioned to freely discharge hardenable liquid from above onto said surface over which it spreads and falls from said edge in the form of a tube, means for varying the distance between the tube-forming member and the opening of said liquid supply means, and means for contacting said flowing material with a hardening agent only after it has substantially attained its tubular shape.

8. An apparatus for forming tubing comprising a tube-forming member having a substantially conical liquid spreading surface and a substantially sharply defined edge, a supply means for a hardenable liquid material having an opening positioned to freely discharge hardenable liquid from above onto said surface over which it spreads and falls from said edge in the form of a tube, a coagulating bath positioned beneath said tube-forming member for contacting said flowing material with a hardening agent only after it has substantially attained its tubular shape, and means for varying the distance between said tube-forming member and the bottom of said coagulating bath.

9. An apparatus for forming tubing comprising a tube-forming member having a substantially conical liquid spreading surface and a substantially sharply defined edge, a supply head for a coagulable liquid having an opening disposed above the liquid spreading surface of said member in position to freely discharge coagulable liquid from above onto said surface over which it spreads and falls from said edge in the form of a tube, means for supporting said tube-forming member from said head extending into said head axially of said opening, means for contacting said flowing material with a coagulating agent only after it has substantially attained its tubular shape, and means carried by said supporting means for supplying coagulating liquid to an area beneath said tube-forming member.

RICHARD BÖSEL.
ALOIS SEIB.